F. W. PERSHING.
HOLDER FOR USE IN COATING RODS FOR ELECTRIC WELDING.
APPLICATION FILED FEB. 6, 1920.
1,354,418. Patented Sept. 28, 1920.
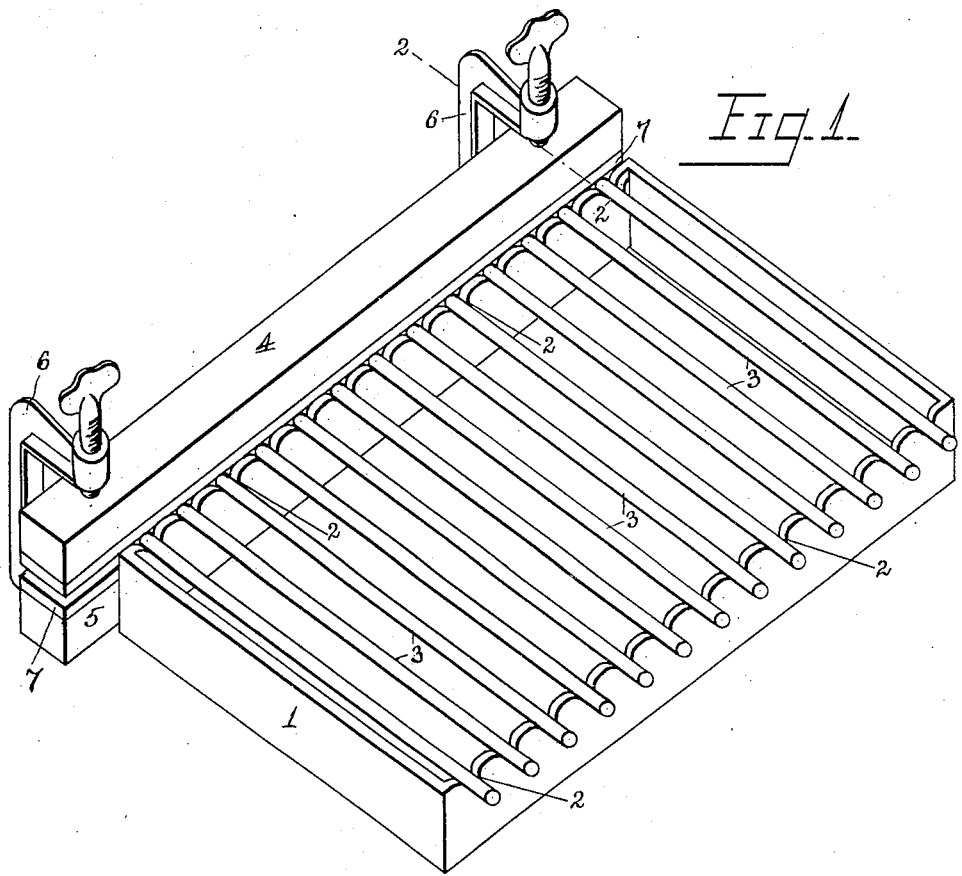
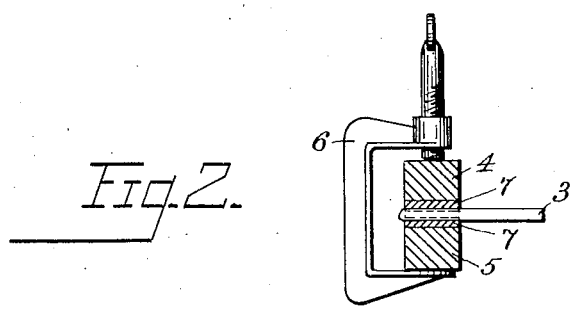
Inventor:
Frank W. Pershing
by W.C. Jindiniston
Attorney.

UNITED STATES PATENT OFFICE.

FRANK W. PERSHING, OF MOLINE, ILLINOIS.

HOLDER FOR USE IN COATING RODS FOR ELECTRIC WELDING.

1,354,418.

Specification of Letters Patent. Patented Sept. 28, 1920.

Application filed February 6, 1920. Serial No. 356,768.

*To all whom it may concern:*

Be it known that I, FRANK W. PERSHING, a citizen of the United States, residing at Moline, in the county of Rock Island and State of Illinois, have invented a new and useful Improvement in Holders for Use in Coating Rods for Electric Welding, of which the following is a specification.

My invention relates to the art of electric welding and more specifically to means employed to hold in position for dipping metallic rods, used in the process of welding, into a liquid fluxing material and retaining them until thoroughly dry.

Referring to the drawings in which similar numerals indicate identical parts—

Figure 1 is a complete isometric view embodying my invention, and Fig. 2 is a section on the line 2—2 of Fig. 1.

A frame 1 is provided having notches 2 formed in the upper edge of opposite sides to hold rods 3 properly spaced apart a sufficient distance so as not to interfere one with another during the process of dipping and drying. After the frame 1 is filled I employ a holder, formed of members 4 and 5 one of which I place below ends of the rods 3, which extend beyond the frame 1, and the other I place above, then by means of clamps 6 the members 4 and 5 are forced together holding the rods 3 spaced apart as in the frame 1. As the holder is not attached to the frame in any way it is readily lifted when filled, and after the rods 3 are dipped in a fluxing material, of the kind desired, the holder with the rods can be suspended in any desired manner until the rods are dry enough to be removed.

Heretofore considerable difficulty has been met with in preserving the spacing between the rods after they have been secured, if the rods are held between the bare surfaces of the wood, of which the members 4 and 5 are made, grooves are soon formed in the wood by continuous use and the pressure of the members 4 and 5 on the rods 3, so that the latter are loosely held, or not held at all, in the holder, and when this occurs the members 4 and 5 have to be discarded and new ones substituted. Various means have been tried to overcome this fault, such as attaching strips of felt to the holding faces of the members 4 and 5, or by the employment of some other soft material for the same purpose. I have found that rubber is the only material that will keep its shape and remain unaffected by the pressure on the rods, so I attach, to the opposing or holding faces of the members 4 and 5 of the holder, strips of rubber 7 and secure them to the members 4 and 5 in any desirable manner. The rubber strips 7 present a continuous and lasting resilient cushion between which the rods 3 are firmly held by the action of the clamps 6 until it is desired to remove the rods from the holder which is accomplished by loosening the clamps 6.

What I claim is—

1. In a device of the character described, the combination with a frame having spaced notches on two of its opposite sides to receive rods, of a holder including two members one above the other and adapted to receive ends of rods between them, a resilient material secured on the opposing surfaces of said members and in contact above and below with said rods, and clamping means operable to press said members together and hold the rods therebetween spaced apart by action of the resilient material.

2. In a device of the character described, the combination with a frame having spaced notches on two of its opposite sides to receive rods, of a holder including two members one above the other and adapted to receive ends of rods between them, a strip of rubber secured on each of the opposed surfaces of said members and in contact above and below with said rods, and clamping means operable to press said members together and hold the rods spaced apart therebetween by action of said rubber strips.

FRANK W. PERSHING.